United States Patent [19]

Frost et al.

[11] 4,297,959

[45] Nov. 3, 1981

[54] METHOD FOR MAKING CHAIN BRACKET WITH STRENGTHENED CHAIN SUPPORTS

[75] Inventors: Charles C. Frost, Ada; Siegfried K. Weis, Byron Center, both of Mich.

[73] Assignee: C. L. Frost & Son, Inc., Grand Rapids, Mich.

[21] Appl. No.: 110,258

[22] Filed: Jan. 7, 1980

Related U.S. Application Data

[62] Division of Ser. No. 872,244, Jan. 25, 1978, Pat. No. 4,220,243.

[51] Int. Cl.³ .............................................. B21D 53/00
[52] U.S. Cl. ................................ 113/116 HH; 29/150
[58] Field of Search .... 113/116 V, 116 CC, 116 HH; 248/247, 248, 300, 301, 317; 29/150; 198/687

[56] References Cited

U.S. PATENT DOCUMENTS

| | | |
|---|---|---|
| 625,427 | 5/1899 | Stewart et al. |
| 1,375,509 | 4/1921 | Heatlie |
| 1,702,803 | 2/1929 | Webb |
| 1,721,316 | 7/1929 | Pribil |
| 1,721,759 | 7/1929 | Webb |
| 1,806,913 | 5/1931 | Paquette |
| 1,906,097 | 4/1933 | Pribil |
| 2,075,261 | 3/1937 | Bishop .............................. 198/177 |
| 2,095,022 | 10/1937 | Bishop .............................. 198/177 |
| 2,101,951 | 12/1937 | McInnis ............................ 198/177 |
| 2,133,391 | 10/1938 | Lemmon ........................... 198/177 |
| 2,242,065 | 5/1941 | Gaboury ............................ 198/177 |
| 2,265,248 | 12/1941 | Pomeroy ........................... 198/177 |
| 2,398,062 | 4/1946 | Webb et al. ....................... 198/177 |
| 2,411,906 | 12/1946 | Suman .............................. 198/177 |
| 2,517,652 | 8/1950 | Gaboury ............................ 198/177 |
| 2,552,897 | 5/1951 | Lemmon ........................... 198/177 |
| 2,644,571 | 7/1953 | Webb et al. ....................... 198/177 |
| 2,780,178 | 2/1957 | Zebley .............................. 105/148 |
| 2,816,643 | 12/1957 | Klamp .............................. 198/20 |
| 2,830,694 | 4/1958 | Zebarth ............................ 198/177 |
| 2,853,955 | 9/1958 | Bishop et al. ..................... 104/88 |
| 2,892,419 | 6/1959 | King ................................. 105/155 |
| 2,931,486 | 4/1960 | Zebarth ............................ 198/203 |
| 2,956,514 | 10/1960 | Bishop .............................. 104/128 |
| 3,041,708 | 7/1962 | Holtz ........................ 113/116 HH X |
| 3,231,067 | 1/1966 | Gaboury et al. ................... 198/177 |
| 3,268,062 | 8/1966 | Gladstone ......................... 198/177 |
| 3,377,872 | 12/1973 | Rikman et al. ..................... 198/20 |
| 3,420,188 | 12/1968 | Dehne et al. ...................... 104/172 |
| 3,854,573 | 12/1974 | Freier, Sr. ......................... 198/177 |
| 3,971,601 | 7/1976 | Sytsma ............................. 308/16 |
| 4,062,511 | 12/1977 | Ray .................................. 248/300 |
| 4,109,598 | 8/1978 | Kucher et al. ............... 113/116 HH |

FOREIGN PATENT DOCUMENTS

| | | |
|---|---|---|
| 1370208 | 7/1964 | France |
| 1403744 | 5/1965 | France |
| 583531 | 2/1957 | Italy |
| 304124 | 3/1955 | Switzerland |
| 617534 | 2/1949 | United Kingdom |
| 706349 | 3/1954 | United Kingdom |
| 708935 | 5/1954 | United Kingdom |
| 835356 | 5/1960 | United Kingdom |
| 852153 | 10/1960 | United Kingdom |
| 1025022 | 4/1966 | United Kingdom |
| 1180133 | 7/1970 | United Kingdom |
| 1466703 | 9/1977 | United Kingdom |
| 1544519 | 4/1979 | United Kingdom |
| 438589 | 1/1975 | U.S.S.R. |

OTHER PUBLICATIONS

Farquhar Conveyors Catalog entitled "Conveyors" by A. B. Farquhar Division of Conveyor Systems Incorporated, 6451 Main St., Morton Grove, Illinois 60053.
FMC Corporation Catalog entitled "Ball Bearing Trolleys", Link-Belt Material Handling Systems Div., FMC Corporation, Colmar, Penn. 18915, Copyright 1972.
Catalog entitled "Frost Food Handling Products" by C. L. Frost & Son, Inc., 2020 Bristol Avenue, N.W., Grand Rapids, Michigan 49504, Copyright 1975.
*Product Engineering*, vol. 31, No. 39, dated Sep. 19, 1960, p. 89.

*Primary Examiner*—Mark Rosenbaum
*Attorney, Agent, or Firm*—Price, Heneveld, Huizenga & Cooper

[57] ABSTRACT

An improved chain bracket, and especially a trolley bracket, for use with overhead conveyor chains and a method for making same which provides an economical bracket having increased chain support strength. The bracket is stamped from sheet metal and includes a chain pad extending transversely across the bracket for engaging and supporting one link of a conveyor chain when mounted on the bracket. A reinforcing portion formed in one piece with and bent from the bracket sheet metal resists and substantially prevents bending of the chain pad under load. The method includes stamping the peripheral outline of the bracket from sheet metal, and bending the chain pad and reinforcing portion integrally and in one piece from the bracket sheet metal.

13 Claims, 23 Drawing Figures

METHOD FOR MAKING CHAIN BRACKET WITH STRENGTHENED CHAIN SUPPORTS

CROSS REFERENCE TO RELATED APPLICATION

This is a division of application Ser. No. 872,244, filed Jan. 25, 1978, now U.S. Pat. No. 4,220,243.

BACKGROUND OF THE INVENTION

This invention relates to chain brackets, and especially to trolley brackets for supporting conveyor chain links in overhead conveyor systems. More particularly, the invention is an improved bracket or trolley bracket which is more economical to manufacture because it is stamped from sheet metal and has increased chain support strength, as well as to a method for making such brackets.

Trolley and other chain brackets used in overhead conveyor systems are typically subjected to many stresses and strains. In the typical manufacturing plant utilizing an overhead conveyor, the conveyor includes numerous horizontal corners as well as changes in vertical height along its length. Each trolley bracket, which is typically supported by a wheel assembly on an overhead I-beam-type or other type conveyor rail or the like, is joined to a conveyor chain which extends along the conveyor rail by means of one of the chain links. A typical method is to insert a pair of trolley brackets through the open center of the link in back-to-back fashion and thereafter move the brackets outwardly with a spacer and secure them with bolts or the like to hold the link in place on the brackets. Other chain brackets, such as those typically fitted between trolley brackets, are also secured to the chain in a similar fashion.

When each combination of brackets and a chain link encounters turns in the conveyor and especially vertical changes in height, the chain changes direction urging the bracket connected links through that same change in direction. This tends to cause the rigidly mounted links to "rock" on the brackets resulting in wear to or deformation of the chain and brackets.

One prior known type of trolley bracket was forged from steel or another metal. The forging method is "tremendously more expensive because it is labor intensive and requires numerous forging dies. Such dies tend to wear out quickly because of extensive configurations and projections in the trolley bracket to be formed. A forged bracket also includes metal which has to be softened by heating to allow forging, is heavier than a stamped sheet metal bracket, is more expensive to heat treat for hardness after forging, and requires secondary machining before use.

Other prior trolley brackets were stamped from sheet metal. Some of these brackets included chain support surfaces which were bent out of the sheet metal itself. Such chain supports often bent and were deformed when stressed during use on a conveyor and subjected to the above "rocking" link motion. In addition, some of the prior stamped trolley brackets supported the chain only with sheared edges of the stamped metal itself which increased wear on the chain.

Accordingly, a need was evident for an economical chain bracket, especially a trolley bracket for overhead conveyor systems which would be stronger and more durable in use, could be more easily and economically heat treated for hardness after formation, and which would include stronger chain supports which would remain in their proper position and resist wear even under stress and load during use.

This invention provides a solution to the above need and problems. Alternative but distinct solutions to the same problems and need are disclosed in copending, commonly assigned, U.S. Patent applications Ser. No. 872,245, now U.S. Pat. No. 4,210,238, invented by Charles C. Frost, Gerald W. Gurney and Frederick Sytsma and Ser. No. 872,265, invented by Gerald W. Gurney and Siegfried K. Weis, both of which were filed on even date herewith.

SUMMARY OF THE INVENTION

Accordingly, the present invention provides an improved chain bracket, and especially a trolley bracket for overhead conveyors as well as a method for making such brackets from sheet metal to provide a more economical, strengthened bracket. The present invention uses at least one chain support or pad as well as a reinforcement for such pad which is bent from the sheet metal of the bracket itself and resists and substantially prevents the pad from bending out of its preferred position during stress and load in use. Principle support for or engagement with the chain in the present invention is provided by smooth, uncut surfaces of the sheet metal so that primary support by cut edges of the metal which could cause greater wear on the chain is avoided.

In addition, the method provides an economical process for stamping and bending brackets including chain pads and reinforcing portions for those pads from sheet metal. Such sheet metal can be heat treated after formation for increased hardness, rigidity and wear resistance.

In one form, the present invention provides an improved trolley bracket of the type having a first end portion with means for supporting a trolley wheel thereon, a second end portion having a chain support for supporting the link of a conveyor chain for moving the bracket along the support when the trolley wheel is attached, and a connecting portion connecting the first and second end portions. The second end portion also includes an aperture for securing the bracket to a bracket attachment or another of the brackets for mounting a chain link thereon. The bracket is stamped in one piece from sheet metal. The chain support includes at least one chain pad extending transverse to the direction of elongation of the bracket for supporting a chain link when mounted thereon. The chain pad is bent from the bracket sheet metal and has a thickness less than its length measured transverse to the elongation of the bracket. Reinforcing means are formed in one piece with and bent from the bracket sheet metal and support at least a major portion of the length of the chain pad for resisting and preventing bending of the chain pad when under load.

In other forms, the invention may be a bracket for attachment to a chain including a chain pad and reinforcing means as set forth herein. The brackets may also include a plurality of such chain pads and the pad or pads may be bent from the marginal edge flanges extending along the periphery of the bracket, lanced or formed from center portions of the bracket, and be separate from or continuous with the reinforcing portions. In each case, a reinforcing portion backs up and supports each chain pad to resist and substantially prevent its movement from its predetermined, preferred position when under load.

In another aspect of the invention, a method for forming a stamped chain bracket or trolley bracket for use with overhead conveyors is provided. The trolley bracket method includes the steps of stamping a trolley bracket from a sheet of metal including forming one end of the bracket for supporting a trolley wheel, forming a second end portion for supporting a chain link of a conveyor chain, and forming an intermediate portion connecting the two end portions. The forming of the second end portion includes bending integrally and in one piece from a portion of the sheet metal of the bracket at least one of the chain pad and reinforcing means for the chain pad, and bending the other of the chain pad and reinforcing means such that the reinforcing means will support the chain pad in use and resist and substantially prevent bending from its position when loaded.

These and other objects, advantages, purposes and features of the invention will become more apparent from a study of the following description taken in conjunction with the drawings.

DESCRIPTION OF THE PREFERRED EMBODIMENTS

Figure 1:
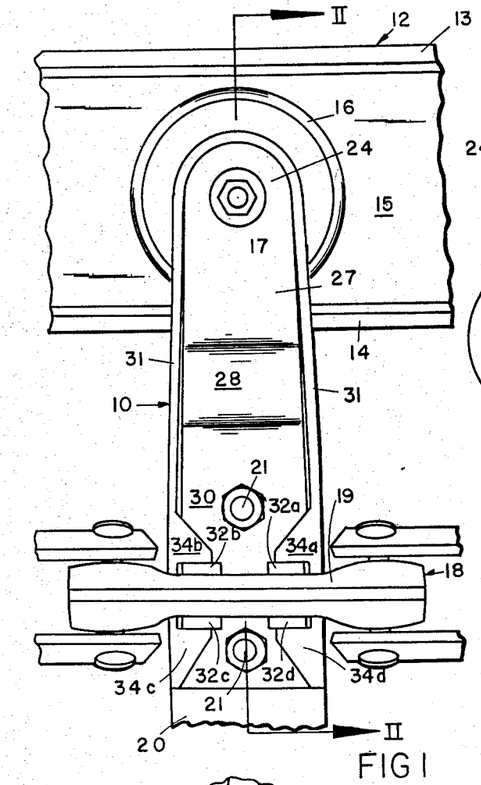
FIG. 1 is a fragmentary, front elevation of a pair of the trolley brackets of the present invention secured in a link of a typical conveyor chain.
Figure 2:
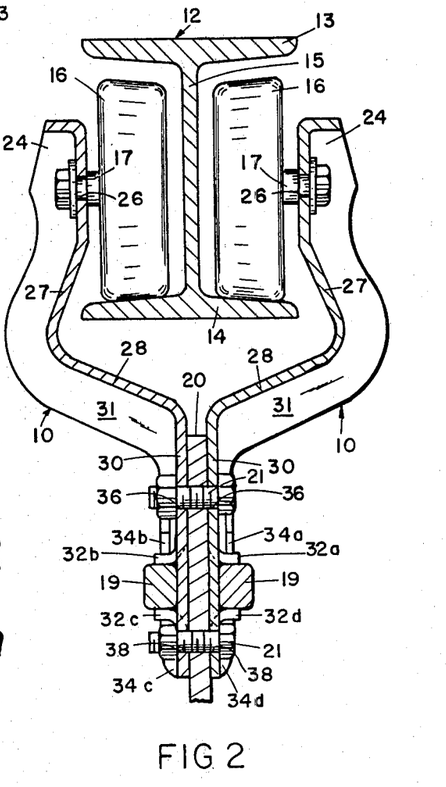
FIG. 2 is a sectional, side elevation of the assembly taken along line II—II of FIG. 1.

Referring now to the drawings is greater detail, FIGS. 1 and 2 illustrate an overhead conveyor assembly including one embodiment of the improved, strengthened, reinforced trolley bracket 10 of the present invention. The overhead conveyor system includes an I-Beam-type overhead support rail 12. Beam 12 includes upper and lower, laterally extending flanges 13, 14 connected by a central wall or vertical flange 15. Lower flange 14 supports one trolley wheel assembly 16 on either side of central wall 15, each wheel assembly 16 including a laterally outwardly extending axle 17 bolted to the upper end of one of the improved trolley brackets 10 of the present invention. Brackets 10 extend downwardly and curve inwardly around flange 14 to a position adjacent one another for receipt of a link from the conveyor chain which moves the brackets and wheel assemblies along the rail 12.

Each pair of brackets 10 is received through the center opening of the central chain link 18 which has parallel side portions 19. Side portions 19 are supported and prevented from moving vertically or in a "rocking" motion by a plurality of chain pads formed in the lower end of the brackets as will be more fully described hereinafter. The bracket lower ends are individually inserted through the central opening in the chain link 18 and moved outwardly to engage side portions 19 after which a central spacer member 20 is inserted between the brackets and securing bolts 21 are passed through to secure the entire assembly in place. The aperture through link 18 which receives brackets 10 is only slightly longer than the width of the brackets thereby preventing longitudinal movement of the brackets in the link. As is best seen in FIG. 2, the spacer or bracket attachment 20 extends downwardly beyond the lower ends of brackets 10 and may include an aperture or other structure for suspending a shackle, support or the like to suspend an object on the conveyor.

Details of bracket 10 are shown in FIGS. 1-4. Bracket 10 is a continuous, elongated body stamped in one piece from sheet steel or other metal typically having a thickness of approximately 0.125 inches. The designed thickness can be increased or decreased depending on the load required to be supported by the brackets. Each bracket includes a first or upper end 24 having an aperture centered therein or receiving the axle 17 of one of the wheel assemblies 16 as shown in FIGS. 1 and 2. The upper end angles slightly outwardly at 27 around the lower flange 14 of rail 12 and merges with a connecting portion 28 extending downwardly and inwardly from the lower end of the upper portion. The connecting portion 28 merges with a continuous, downwardly extending lower or second end 30 which is generally planar between the side edges and extends generally parallel to the portion of upper end 24 which includes aperture 26.

Each bracket 10 also includes an upstanding, marginal edge flange 31 extending continuously along the peripheral edges of the bracket except for relieved areas aligned with one another transversely across the bracket lower end 30 to provide a space for receiving one side portion 19 of a center chain link 18. Space S is slightly wider than the width of one side portion 19. Flanges 31 provide strength and rigidity for the formed bracket and are stamped, bent and formed in one piece with the remainder of the bracket.

Support for center chain link 18 of the conveyor chain is provided by four spaced but aligned chain pads or supports 32a, 32b, 32c and 32d which are formed in one piece and bent from the planar center area of lower bracket end 30. Each chain pad 32 extends upwardly, generally perpendicular to the planar center area of lower end 30 and has a generally planar chain link engaging surface facing the space S where the link is received. The chain link engaging surface is formed from the planar, smooth surface of the sheet metal to avoid, as much as possible, contact of the link portions with cut metal portions of the bracket to reduce wear and abrasion.

Figure 3:
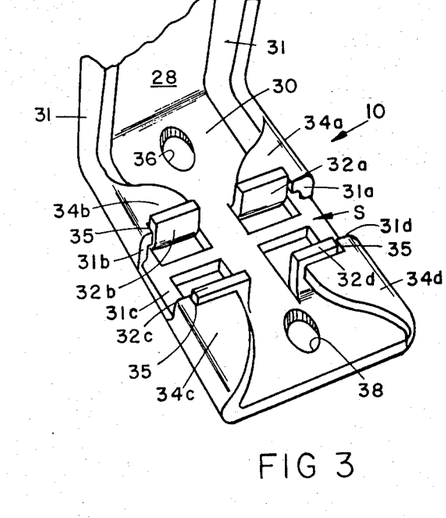
FIG. 3 is a fragmentary, perspective view of the strengthened, stamped trolley bracket shown in FIGS. 1 and 2.

Extending inwardly and behind each of the chain pads from the adjacent marginal edge flanges 31 are curved, generally triangular, reinforcing members or portions 34a, 34b, 34c and 34d, best seen in FIG. 3. Reinforcing members 34 are formed in one piece and bent laterally inwardly from the bracket sheet metal such that they are parallel to the planar bracket portion 30 but are spaced above that bracket portion adjacent the free ends of the chain pads 32. The end edges 31a, 31b, 31c and 31d of flanges 31, which help define the link space S, are flush with the chain-engaging surfaces of the chain pads 32 to provide additional support for the chain links. Even though surfaces 31a—31d are cut surfaces of the sheet metal, their flush extension with the pads 32 prevents them from unduly wearing the chain. Each reinforcing member or portion 34 also includes a notch or recess 35 having a width equal to the thickness of the chain pad. The edge of recess 35 in each reinforcing member 34 has a thickness equal to that of the sheet metal and abuts the rear surface of the chain pad opposite to the chain-engaging surface along a major portion of the length of the pad. Such support for a major portion of the length of each pad, coupled with provision of the support at the free end of each pad, provides a secure, strong, reinforced arrangement which resists and substantially prevents the pads from bending even when the chain links tend to "rock" or move at the various points along the conveyor. The chain pad surfaces extend transversely across the bracket generally perpendicular to the direction of elongation of the bracket and are aligned with opposing and adjacent pads to provide secure support for the sides 19 of the center link portion 18.

Figure 4:
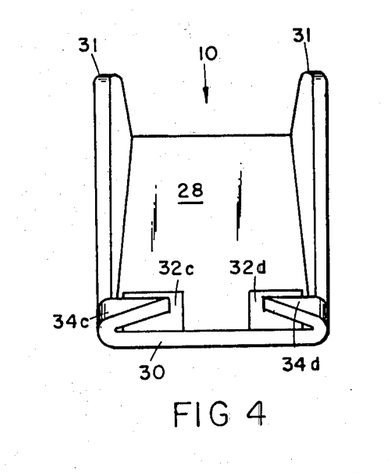
FIG. 4 is an end elevation of one of the trolley brackets shown in FIGS. 1-3.

Lower bracket portions 30 are also provided with apertures 36, 38 aligned along the longitudinal center line of the bracket for receiving bolts 21 or other fasteners which are designed to extend through a spacer 20 and the opposing bracket 10 to secure the various portions together (FIG. 2). The lowermost reinforcing members 34c, 34d taper downwardly toward the end edge of the lower end portion to reduce the bulkiness of that end portion as shown in FIGS. 2-4. The open areas from which the chain pads 32 are bent in the planar portion of lower end 30 of bracket 10 do not weaken the bracket because the stress and load for support of objects on the conveyor is taken principally by the spacer 20 and bolt 21 extending through apertures 36 at the upper part of lower end 30 with some additional support provided by the bolt through apertures 38. The lower portion of lower end 30 provides a securing area for the chain and is not intended to provide the principle support for objects on the conveyor.

Figure 5:
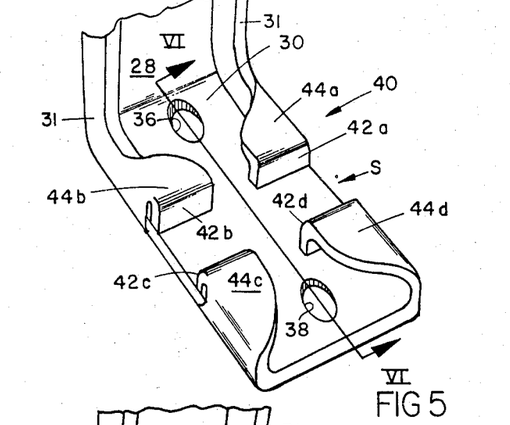
FIG. 5 is a fragmentary, perspective view of a second embodiment of the stamped, strengthened trolley bracket of the present invention.
Figure 6:
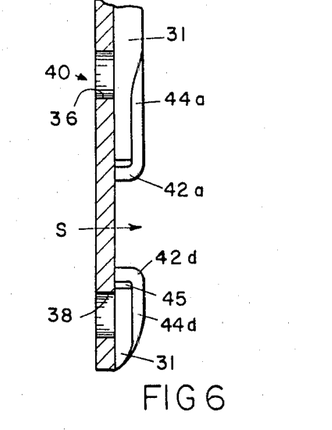
FIG. 6 is a sectional, fragmentary, side elevation of the trolley bracket taken along line VI—VI of FIG. 5.

Referring now to FIGS. 5 and 6, a second embodiment 40 of the improved trolley bracket is shown wherein like portions and parts to those shown in FIGS. 1–4 are illustrated with like numerals. Embodiment 40 is substantially the same as bracket 10 except for a modified arrangement of its chain pads and reinforcing portions. In bracket 40, the chain pads are flanges 42a–42d integral and continuous with the ends of the rounded, generally triangular, reinforcing portions 44a–44d. Each chain pad is bent generally at a right angle to the plane of the reinforcing portion which is, in turn, bent inwardly and toward the center of the bracket from a marginal edge flange 31. Each chain pad flange 42 has a length sufficient to cover the end edge of the marginal edge flanges 31 at the center link receiving space S so that a chain link engaging surface formed completely of side surfaces of the sheet metal and without any cut metal edges is formed. The lower edge of the chain pad is rectilinear and is in abutment with the planar bracket portion 30. Reinforcing portions 44a–44d extend across the entire length of the chain pads which in turn are transverse to the direction of elongation of the bracket. Once again, the reinforcing portions are spaced above the planar bracket area and are generally parallel thereto. Any space between the rear surface of the chain pad portions and the end edges of the marginal flanges such as that shown at 45 (FIGS. 5 and 6) is preferably kept to a minimum so that the chain pad flanges will draw support from the end surfaces of the marginal edge flanges 31 for further resistance to bending when under load.

Figure 7:
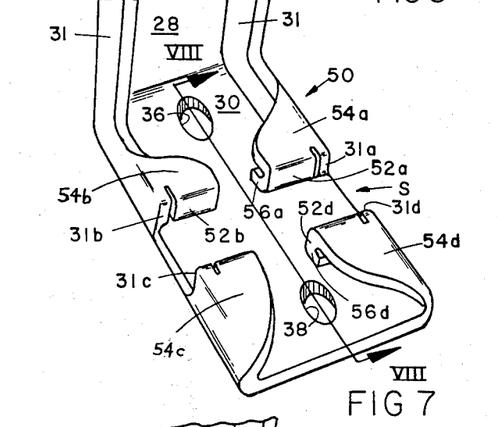
FIG. 7 is a fragmentary, perspective view of a third embodiment of a stamped, strengthened trolley bracket of the present invention.
Figure 8:
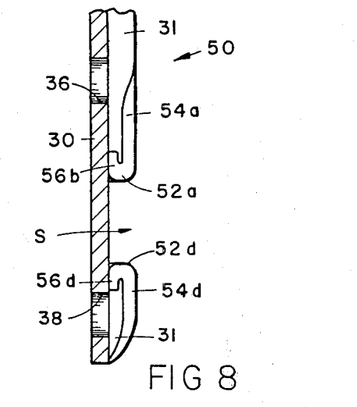
FIG. 8 is a fragmentary, sectional, side elevation of the bracket taken along line VIII—VIII of FIG. 7.

Another embodiment 50 of the bracket is shown in FIGS. 7 and 8 wherein like parts to those embodiments previously described bear like numerals. Embodiment 50 includes a slightly modified chain pad and reinforcing portion arrangement. The chain pads in embodiment 50 are formed by integral, extending flanges 52a–52d formed in one piece with and bent from the ends of reinforcing portions 54a–54d which are bent inwardly toward the center of the bracket from the marginal edge flanges. Chain pads 52a–52d have chain link engaging surfaces flush with end edges 31a–31d respectively of the marginal edge flanges which define the link-receiving space S. Pads 52 each extend continuously into an additional buttressing flange 56a–56d. Flanges 56 are in abutment and engagement with the planar area of the lower bracket portion 30 and extend parallel to the reinforcing portions 54, both of which are generally perpendicular to the chain pad surfaces which extend transversely across the bracket. Reinforcing portions 54 support the portions of the chain pads spaced farthest from the bracket while the additional flanges 56 provide support for the portions of the pads closest to the bracket. The reinforcing portions 54, chain pads 52 and additional flanges 56 are bent over from the marginal edge flanges 31 though they are immediately adjacent thereto on the inside and any space therebetween is kept to a minimum. The side surfaces of the flanges 56 which abut the inside surfaces of marginal edge flanges 31 also serve to help resist bending or skewing of the inner portions of the chain pads away from space S.

Figure 9:
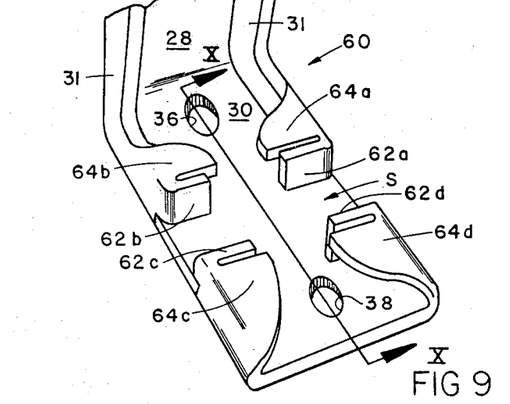
FIG. 9 is a fragmentary, perspective view of another embodiment of the present invention.
Figure 10:
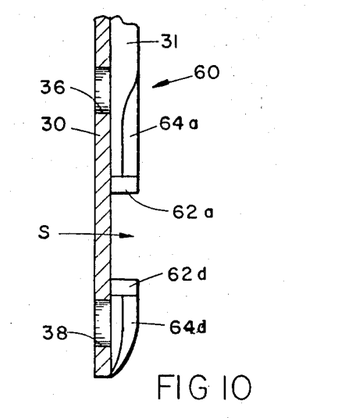
FIG. 10 is a sectional, side elevation of the bracket taken along line X—X of FIG. 9.

Yet another modified embodiment 60 of the improved trolley bracket shown in FIGS. 1-8 is illustrated in FIGS. 9 and 10. Once again like portions and parts to those described in the other embodiment bear like numerals. In embodiment 60, chain pads 62a-62d are formed in one piece with and bent from the marginal edge flanges along either side edge of the bracket. Pads 62a, 62d and 62b, 62c, respectively, are bent away from one another and laterally, inwardly toward the center of the bracket such that they extend perpendicularly to bracket portion 30 and are also generally perpendicular to the upstanding flanges 31. Reinforcing portions or members 64a-64d are bent inwardly from the top edges of marginal edge flanges 31 an abut and engage the separately formed chain pads 62 at a position spaced above or outwardly from the planar bracket portion 30. As in embodiment 10, reinforcing members 64 include cut metal edges having a thickness equal to that of the sheet metal which abut and support the chain pads. Reinforcing members 64 extend along the entire length of chain pads 62 and, as shown in FIG. 9, in some cases extends slightly beyond the inner end surfaces of the chain pads for secure support. Pads 62 are reinforcing members 64 are thus formed from separate portions of the marginal edge flanges while the chain link supporting surfaces of pads 62 are aligned and parallel and define the link-receiving space S as in the other embodiments.

Figure 11:
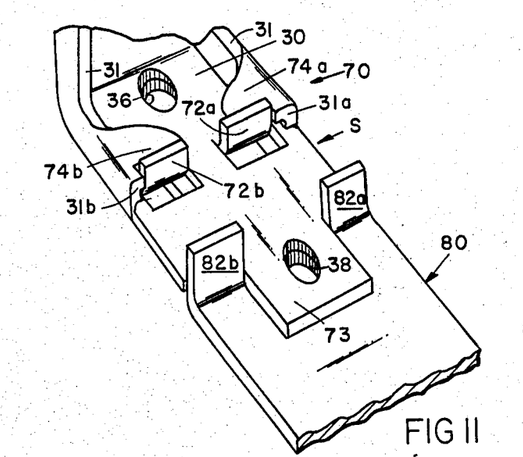
FIG. 11 is a fragmentary, perspective view of yet another embodiment of the present invention including a bracket and a bracket attachment which forms a portion of the chain support means.
Figure 12:
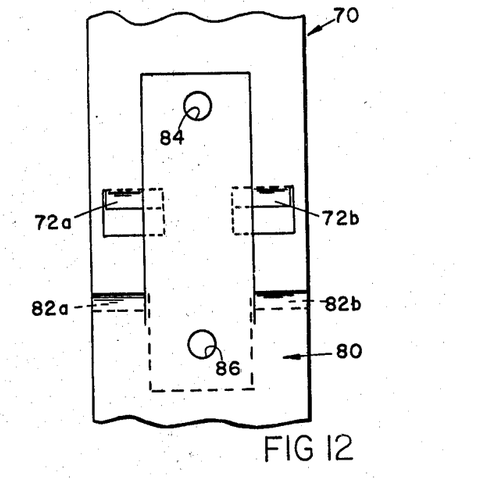
FIG. 12 is a fragmentary, rear elevation of the assembly shown in FIG. 11.

As shown in FIGS. 11 and 12, yet another embodiment 70 of the improved trolley bracket is illustrated wherein the link-receiving space S is formed by portions of the trolley bracket 70 as well as portions of a bracket attachment or spacer 80. Support for the upper edge of side portion 19 of the chain link 18 is provided by a pair of aligned chain pads 72a and 72b reinforced and supported by bent, folded reinforcing members 74a, 74b, respectively, extending from the marginal edge flanges 31 in a manner identical to that for bracket embodiment 10. Again, the end surfaces 31a, 31b of modular edge flanges 31 are flush with the chain link-engaging surfaces of pads 72a, 72b. The lower portion of the chain link-receiving space is provided by upstanding chain pads 82a, 82b folded and bent in one piece from the spacer or bracket attachment 80, a pair of which is fitted between a pair of the brackets 70 when they are secured in the chain of an overhead conveyor system. Pads 82a, 82b are generally perpendicular to the planar bracket area 30 as well as to the generally planar, sheet metal spacer or bracket attachment. A downwardly extending portion 73 of bracket 70 extends between pads 82a, 82b and includes securing aperture 38. As shown in FIG. 12, the bracket attachment or spacer 80 includes apertures 84, 86 which are aligned with apertures 36, 38, respectively, for receiving securing bolts therethrough in the manner shown in FIG. 2. Accordingly, support for the chain link can be provided by chain pads formed integrally on the trolley bracket in combination with chain pads formed on a spacer or bracket attachment.

Figures 13, 14, 15:
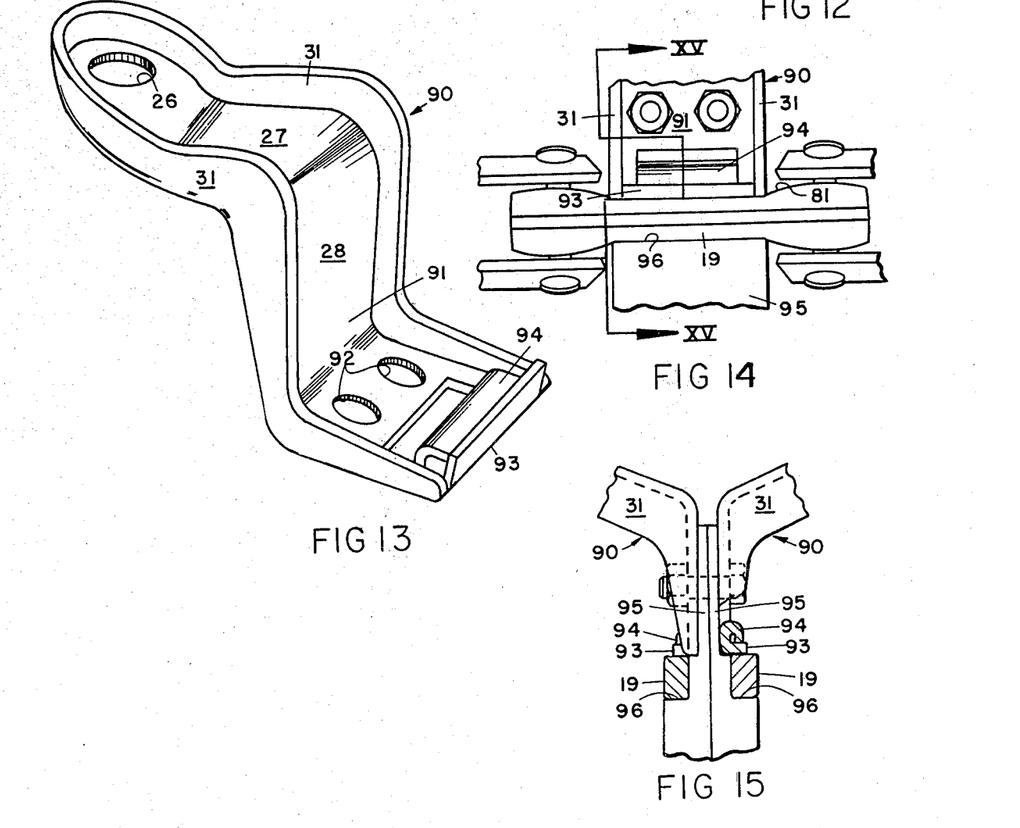
FIG. 13 is a perspective view of yet another embodiment of the trolley bracket of the present invention.
FIG. 14 is a fragmentary, front elevation of the bracket shown in FIG. 13 assembled with a trolley bracket spacer attachment and a typical chain link.
FIG. 15 is a fragmentary, sectional side elevation of the assembly taken along line XV—XV of FIG. 14.

FIGS. 13-17 illustrate two further "horizontal hole" embodiments 90 and 100 wherein support for the chain link below the trolley bracket is provided by a spacer or bracket attachment secured to the trolley bracket in a manner similar to but slightly modified from that as shown in FIGS. 11 and 12. In embodiment 90 shown in FIGS. 13-15, wherein like parts to those embodiments previously described bear like numerals, a shorter lower bracket portion 91 is included. A pair of horizontally aligned, securing apertures 92 are formed through bracket portion 91 immediately above the reinforced chain pad 93. Pad 93 extends substantially the full width of the bracket between marginal edge flanges 31 across and transverse to the elongated direction of the bracket and is generally perpendicular to the planar bracket portion 91. Apertures 92 receive side by side securing bolts as shown in FIGS. 14 and 15.

Support and reinforcement for pad 93 is provided by a C-shaped reinforcing member 94 bent out of the sheet metal forming bracket portion 91 as is seen in FIGS. 13-15. One leg of the C-shaped reinforcing member 94 extends out of the metal of the bracket 91 in one direction and curves arund such that the other leg extends in the opposite direction and has an end edge comprising a thickness of the sheet metal abutting the rear surface of the chain pad opposite to the chain link-engaging surface. Reinforcing flange 94 is slightly shorter than the length of the chain pad 93 but supports a major portion of that pad to resist and prevent bending under load. Support for the lower edge of chain link side portion 19 is provided by shoulders 96 on spacers or bracket attachments 95 inserted between a pair of the brackets 90 when assembled in an overhead conveyor as shown in FIGS. 14 and 15. The link-engaging surface of chain pad 93 is the lowermost surface of bracket 90 as will be seen in FIG. 15.

Figures 16, 17, 18, 19, 20, 21:
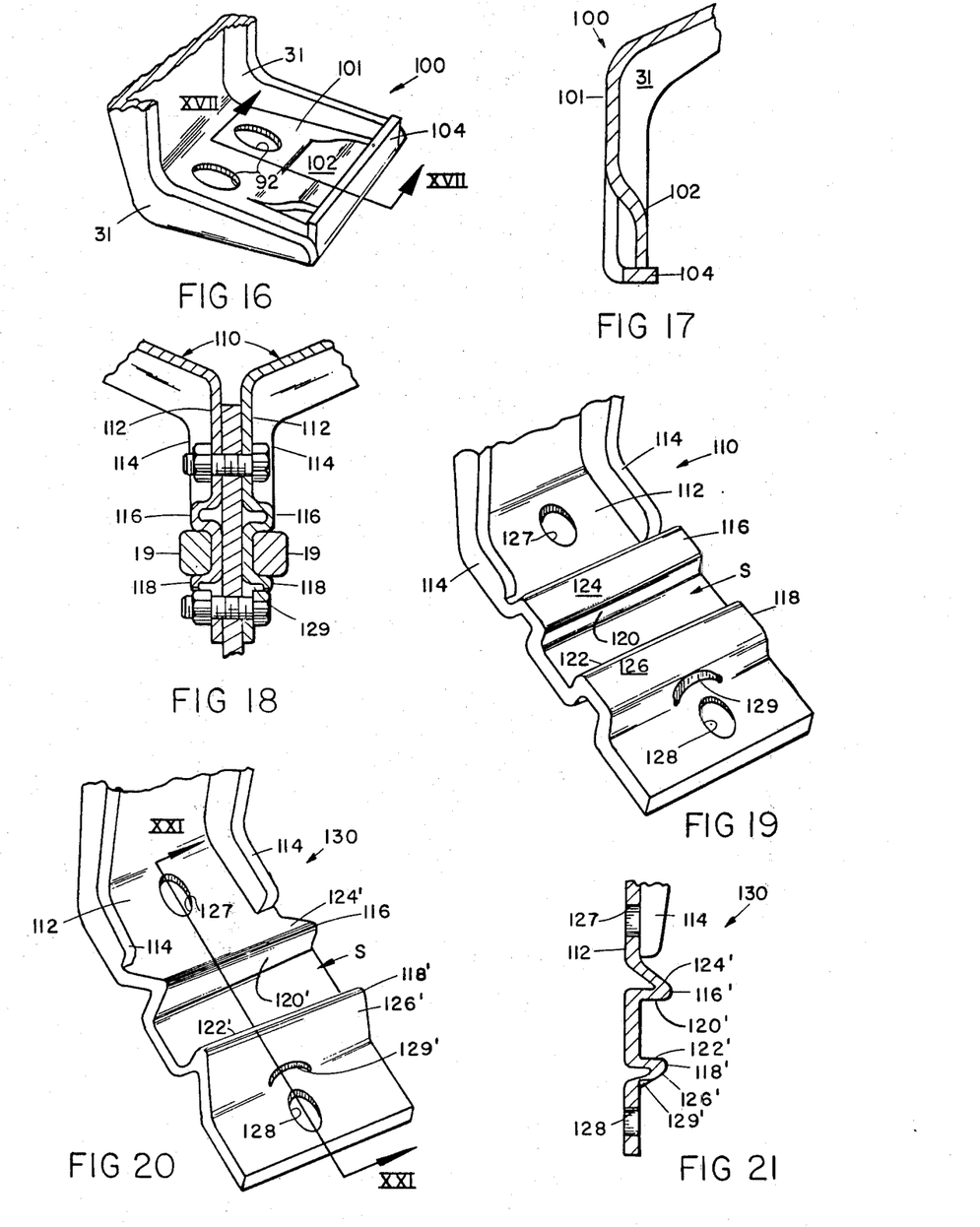
FIG. 16 is a fragmentary, perspective view of yet another embodiment of the trolley bracket of the present invention.
FIG. 17 is a fragmentary, sectional, side elevation of the bracket taken along plane XVII—XVII of FIG. 16.
FIG. 18 is a fragmentary, sectional, side elevation of a pair of another embodiment of the improved trolley brackets of the present invention shown assembled with an intermediate bracket spacer attachment and a conveyor chain link.
FIG. 19 is a fragmentary, perspective view of one of the trolley brackets shown in FIG. 18.
FIG. 20 is a fragmentary, perspective view of a slightly modified version of the trolley bracket shown in FIGS. 18 and 19.
FIG. 21 is a fragmentary, sectional, side elevation of the bracket taken along line XXI—XXI of FIG. 20.

As shown in FIGS. 16 and 17, embodiment 100 of the improved, stamped trolley bracket is similar to bracket 90 but includes a slightly differing reinforcement member for the transversely extending chain pad. In embodiment 100, where like parts and portions bear like numerals to those portions previously described, reinforcing member 102 is lanced, bent and offset from the planar bracket portion 101 such that a cut end edge having a thickness equal to that of the sheet metal abuts the chain pad 104 at a position spaced outwardly from the planar bracket portion 101. This version provides strong reinforcement for pad 104 and requires less bending. Embodiment 100 is also intended for use with spacer or bracket attachments including shoulders for support of the lower edges of side portions 19 of center chain links such as those shown at 95 in FIGS. 13-15.

In FIGS. 18 through 21, two additional embodiments 110 and 130 of the improved trolley bracket are shown. Brackets 110 each include generally planar, lower bracket portions or ends 112 extending between marginal edge flanges 114 and downwardly below those flanges. Support for the conveyor chain link is provided by stamped ribs 116, 118 extending transversely across the entire width of the lower bracket portion 112 below the side flanges 114. Ribs 116, 118 include elongated chain link engaging legs 120, 122, respectively, which extend outwardly generally perpendicular to the lower bracket portion 112 and merge with that bracket portion. Extending away from the link-engaging legs 120, 122 which define link-receiving space S are supports or reinforcing legs 124, 126. Reinforcing legs 124, 126 extend across the bracket and support the entire length of the link-engaging legs. Legs 124, 126 have a generally L-shaped cross section. One end of each merges continuously with the edge of legs 120, 122, respectively, which is spaced from the lower bracket portion 112 and the other end merges into the lower bracket portion at the other end. The outermost surfaces of legs 124, 126 are generally parallel to the lower bracket portion 112. Securing apertures 127, 128 are provided along the centerline of the bracket. A semi-circular recess 129 is provided adjacent the lowermost aperture 128 to allow room for tightening a nut or bolt head because the aperture is spaced close to rib 118 as is best seen in FIGS. 18 and 19. Ribs 116, 118 provide rigid, continuous support preventing "rocking" of the chain link and yet are easily formed in a single stamping operation by an appropriately shaped stamping die.

As shown in FIGS. 20 and 21, a slightly modified version 130 of the bracket 110 is illustrated wherein like numbers illustrate like portions to those in embodiment 110. The primary difference with embodiment 130 is the shape of the support or reinforcing legs 124′, 126′ for chain link-engaging and supporting ribs 116′, 118′. Reinforcing legs 124′, 126′ merge with the same outwardly spaced legs of transversely extending chain link-engaging legs 120′, 122′ as in embodiment 110 but angle in an inclined manner toward bracket portion 112 and merge continuously therewith. Accordingly, the overall shape of each rib 116′, 118′ is generally V-shaped while ribs 116, 118 in embodiment 110 are generally U-shaped. Ribs 116′, 118′, however, provide similar strong, secure, reinforced support for the chain link-engaging legs as do legs 124, 126 to resist and substantially prevent bending and deformation of the chain supports during use. Embodiment 130 is assembled with a chain link and bracket attachment in a manner similar to embodiment 110 as is shown in FIG. 18.

In each of the embodiments 10, 40, 50, 60, 70, 90, 100, 110 and 130 described above, at least one of the chain pads is formed integrally with and bent from the metal of the stamped bracket and is reinforced by a reinforcing portion or member also bent from the sheet metal of the bracket. At least a major portion of the length of such a chain pad is supported by the reinforcing member or portion to resist or prevent bending of the pad when under load, regardless of whether the pad is formed from the planar bracket portion or the marginal side edge flanges of the bracket. The improved bracket is substantially more economical and yet stronger than prior known brackets because it can be stamped from sheet metal and progressively formed with metal forming dies and yet be hardened by heat treating after formation.

DESCRIPTION OF THE PREFERRED METHOD

Figure 22:
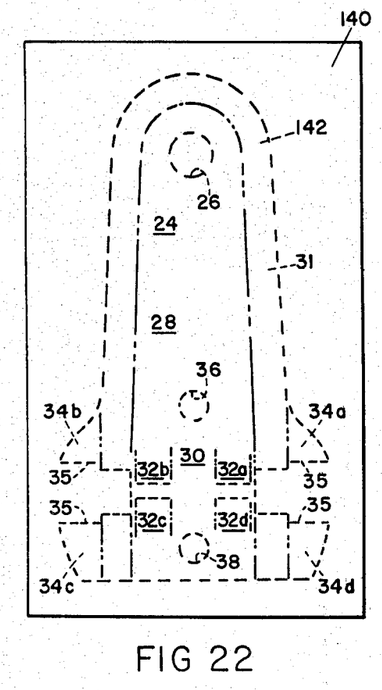
FIG. 22 is a layout of the pattern from which the stamped trolley bracket shown in FIGS. 1-4 is stamped and formed.
Figure 23:
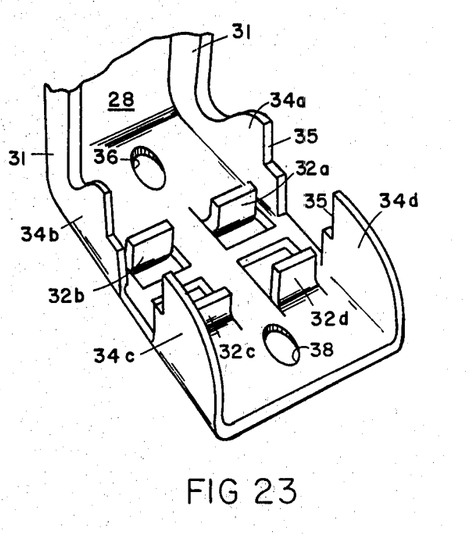
FIG. 23 is a fragmentary, perspective view of an intermediate step during the stamping and bending method for forming the trolley bracket shown in FIGS. 1-4 and 22 from sheet metal.

Referring now to FIGS. 22 and 23, the preferred method for forming the stamped trolley bracket of embodiment 10 of FIGS. 1-4 begins with the stamping from a planar sheet 140 of steel or a length of coiled sheet steel of a pattern or outline which will provide all the various areas and portions included in the stamped bracket. These include first or upper end 24, second or lower end 30, connecting portion 28, marginal side edge flanges 31, chain pads 32a–32d, reinforcing members 34a–34d and apertures 26, 36 and 38. The entire outer periphery 142 of the bracket is stamped simultaneously from the sheet metal 140 in the desired pattern as shown in FIG. 22. During such stamping, the angular shape of the bracket may be simultaneously formed such that upper and lower portions 24, 30 are generally parallel to one another and connected by portion 28 extending at an angle thereto, marginal edge flanges 31 may be bent upright, apertures 26, 36, 38 may be stamped, punched or lanced in their respective positions, and chain pads 52a–32d may be lanced and bent upright from the planar bracket portion 30 (FIG. 23). Although these operations are preferably performed simultaneously resulting in the partially formed bracket shown in FIG. 23, they may also be done progressively and consecutively in progressive dies after the initial pattern outline is stamped from the sheet metal.

If the chain pads are formed simultaneously with the initial stamping of the pattern and marginal edge flanges 31 (as shown in FIG. 23), the next step is to bend the reinforcing members 34a–34d inwardly using forming dies such that the recesses 35 abut the rear surfaces of each of the chain pads 32. Alternately, reinforcing members 34 could be formed at right angles to marginal edge flanges 31 initially followed by lancing and bending of chain pads 32 upwardly into engagement with the recesses 35 from the rear side of the bracket opposite the reinforcing members using appropriate dies, lances or the like. Thus, in embodiment 10, either the chain pads or reinforcing members or portions are formed first, followed by bending and formation of the other of those two parts. With appropriate dies forming of the pads and reinforcing portions can also be performed simultaneously as mentioned above. This also applies to bracket embodiments 60, 70, 90 and 100.

However, the method for embodiments 40 and 50 is slightly different in that the pattern must be predetermined such that the chain pad portion or flanges 42, 52 will extend from the outer edges of reinforcing members 44, 54. In embodiment 40, chain pads 42 may first be bent upwardly out of the plane of the sheet metal pattern, while the rest of the pattern remains in its planar orientation followed by stamping of the marginal edges flanges and reinforcing members to an upright position in the manner shown in FIG. 23. Thereafter, further bending of the reinforcing members brings chain pads 42 downwardly into engagement with the bracket. Alternately, chain pads 42 can be bent at right angles to the reinforcing portion after the marginal edge flanges 31 and reinforcing members 44 are stamped to their upstanding positions similar in the manner shown in FIG. 23.

With respect to embodiment 50, the process is similar to that for embodiment 40 with the exception of the additional bending step for flanges 56 sometime prior to final bending of the reinforcing members 54 to their positions parallel with bracket portion 30.

In embodiment 60, chain pads 62 must be separately folded inwardly prior to, after, or simultaneously with the folding of the reinforcing portions 64 inwardly toward the center of the bracket. Preferably, pads 62 are bent or folded inwardly prior to bending reinforcing members 64 inwardly.

In embodiments 90 and 100, either the chain pads 93, 104 or the reinforcing members 94, 102 can be formed first. Simultaneous bending of the pads and reinforcing members can also be accomplished with appropriate dies. Preferably, reinforcing members 94, 102 are bent upwardly from the middle portion of the bracket with flange 94 requiring one additional step of doubling over or bending toward the chain pad 93. Flange 102 is merely offset from its generally planar position with respect to the remainder of the bracket portion 101.

With embodiments 110 and 130, formation of ribs 116, 118 and 116′, 118′ is preferably accomplished in a single stamping step along with formation of the remainder of the bracket portions. The metal dies used for these brackets will include upstanding flanges whose exterior shape corresponds to a U or V depending on which type of rib will be formed. The ribs will thus be formed simultaneously with formation by stamping of the upper end, connecting portion and marginal side edge flanges of the bracket along with the punching of the securing apertures in the upper and lower bracket end portions.

Preferably, sheet steel is used for the brackets and bracket attachments of this invention. One type found useful is low carbon 1010 steel. After stamping and bending, the formed brackets and bracket attachments can be surface hardened by carbarizing which includes heating them to approximately 1500° to 1550° F. in a furnace while inducing carbon into the furnace atmosphere. The carbon enters the metal surfaces for greater hardness. Alternately, higher carbon 1035 steel can be stamped and bent and thereafter surface hardened by heating to approximately 1500° to 1550° F. followed by quenching in an ambient temperature oil bath. Although the above surface hardening steps could also be performed on prior know forged brackets, it was more difficult and expensive to do so than with the present stamped brackets because of the surface configuration of the forged parts. In addition, the present bracket and method enable much easier use of and formation from stainless or other alloy materials which are difficult to forge or cast.

Accordingly, the present invention provides an improved chain or trolley bracket and method for making the same which provides a stronger, yet more economical bracket than has previously been available. This bracket is manufactured with metal stamping and bending methods and provides chain supports which are as strong or stronger than any bracket known previously.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A method for forming stamped trolley brackets for use with overhead conveyors comprising the steps of:
    (1) stamping a trolley bracket from a sheet of metal including forming one end of said bracket for supporting a trolley wheel, a second end portion for supporting a chain link of a conveyor chain, and an intermediate portion connecting said two end portions;
    (2) said forming of said second end portion including bending integrally and in one piece from a portion of the sheet metal of said bracket at least one of a chain pad for supporting a conveyor chain link when mounted thereon and reinforcing means for said chain pad;
    (3) bending the other of said chain pad and reinforcing means from said bracket sheet metal such that said reinforcing means will support said chain pad in use and resist bending or deformation from its position when loaded; and
    (4) said bending including bending said chain pad from a portion of said sheet metal separate from the portion from which said reinforcing means is bent; said separate chain pad and reinforcing means being bent such that they extend in different planes but engage and abut another after bending whereby said second bracket end portion is ready for receipt of and engagement with a link of a conveyor chain after bending.

2. The method of claim 1 including bending marginal edge flanges from said sheet metal along at least portions of said trolley bracket periphery; and bending said reinforcing means from said sheet metal of at least one of said marginal edge flanges.

3. The method of claim 2 including lancing and forming said chain pad from said bracket sheet metal intermediate said marginal edge flanges such that it extends generally transverse to a line extending along said bracket and between the ends of said bracket; the bending of said reinforcing means including bending a reinforcing flange over toward the middle of said bracket from one of said marginal edge flanges such that said reinforcing flange has an edge comprising a thickness of said sheet metal which abuts a surface of said chain pad.

4. The method of claim 2 including bending said chain pad laterally inwardly toward the middle of said bracket from one portion of one of said marginal edge flanges; the bending said reinforcing means including bending a reinforcing flange also toward said bracket middle from a second portion of said one marginal edge flange such that said reinforcing flange is immediately adjacent and abuts said chain pad.

5. The method of claim 1 including bending said chain pad from a portion of said sheet metal intermediate the side edges of said bracket such that said chain pad extends transversely between said side edges; the bending of said reinforcing means including bending a reinforcing portion from a portion of said bracket sheet metal immediately adjacent said chain pad.

6. The method of claim 5 including forming said reinforcing portion into a reinforcing member having the cross-sectional shape of a C having two continuous legs, one leg of said reinforcing member extending in one direction out of said bracket sheet metal and extending continuously around and in the opposite direction to form the other leg which abuts a surface of said chain pad at a position spaced from the position at which said chain pad is bent from and joins said bracket.

7. The method of claim 5 including lancing a portion of said bracket sheet metal adjacent said chain pad and offsetting one end of said lanced portion from its original position such that it abuts said chain pad at a position spaced from the position at which said chain pad is bent from and joins said bracket.

8. The method of claim 1 including bending marginal edge flanges from said bracket sheet metal along at least portions of the periphery of said trolley bracket; stamping at least one aperture in said one end of said bracket; and offsetting said one end of said bracket from said second end of said bracket such that said intermediate connecting portion extends angularly between said end portions.

9. A method for forming stamped trolley brackets for use with overhead conveyors comprising the steps of:
    (1) stamping a trolley bracket from a sheet of metal including forming one end of said bracket for supporting a trolley wheel, a second end portion for supporting a chain link of a conveyor chain, and an intermediate portion connecting said two end portions;

(2) said forming of said second end portion including bending integrally and in one piece from a portion of the sheet metal of said bracket at least one of a chain pad for supporting a conveyor chain link when mounted thereon and reinforcing means for said chain pad;

(3) bending the other of said chain pad and reinforcing means from said bracket sheet metal such that said reinforcing means will support said chain pad in use and resist bending or deformation from its position when loaded;

(4) bending marginal edge flanges from said sheet metal along at least portions of said trolley bracket periphery; and bending said reinforcing means from said sheet metal of at least one of said marginal edge flanges; and (5) bending said chain pad from the portion of said sheet metal which forms said reinforcing means such that said chain pad extends at an angle to said reinforcing means, is in one piece, integral and continuous therewith, and abuts said second end portion of said bracket.

10. A method for forming stamped trolley brackets for use with overhead conveyors comprising the steps of:

(1) stamping a trolley bracket from a sheet of metal including forming one end of said bracket for supporting a trolley wheel, a second end portion for supporting a chain link of a conveyor chain, and an intermediate portion connecting said two end portions;

(2) said forming of said second end portion including bending integrally and in one piece from a portion of the sheet metal of said bracket at least one of a chain pad for supporting a conveyor chain link when mounted thereon and reinforcing means for said chain pad;

(3) bending the other of said chain pad and reinforcing means from said bracket sheet metal such that said reinforcing means will support said chain pad in use and resist bending or deformation from its position when loaded;

the bending of said chain pad and reinforcing means including stamping a pair of spaced, continuous ribs in the sheet metal of said second end portion, said stamping including bending an upstanding chain link-engaging leg in each rib from said sheet metal of said second end portion and a reinforcing leg in each rib from said sheet metal of said second end portion extending continuously from a portion of said chain link-engaging leg which is spaced from the remainder of said second end portion and merges into said second end portion.

11. A method for forming stamped brackets for use with overhead and other conveyor chains comprising the steps of:

(1) stamping a bracket from a sheet of metal including forming one portion for engaging a chain link of a conveyor chain, and another portion for securing a suspended object to said bracket;

(2) said forming of said one portion including bending integrally and in one piece from a portion of the sheet metal of said bracket at least one of a chain pad for supporting a conveyor chain link when mounted thereon and reinforcing means for said chain pad;

(3) bending the other of said chain pad and reinforcing means from said bracket sheet metal such that said reinforcing means will support said chain pad in use and resist bending or deformation from its position when loaded; and (4) said bending including bending said chain pad from a portion of said sheet metal separate from the portion from which said reinforcing means is bent; said separate chain pad and reinforcing means being bent such that they extend in different planes but engage and abut one another after bending whereby said bracket portion for engaging a chain link of a conveyor chain is ready for receipt of and engagement with a link of a conveyor chain after bending.

12. The method of claim 11 including bending marginal edge flanges from said sheet metal along at least portions of said bracket periphery; and bending said reinforcing means from said sheet metal of at least one of said marginal edge flanges.

13. The method of claim 12 including lancing and forming said chain pad from said bracket sheet metal intermediate said portions of said bracket periphery such that it extends in a direction generally across said bracket; the bending of said reinforcing means including bending a reinforcing flange over toward the middle of said bracket from one of said marginal edge flanges such that said reinforcing flange has an edge comprising a thickness of said sheet metal which abuts a surface of said chain pad.

* * * * *

UNITED STATES PATENT AND TRADEMARK OFFICE
CERTIFICATE OF CORRECTION

PATENT NO. : 4,297,959

DATED : November 3, 1981

INVENTOR(S) : Charles C. Frost, Siegfried K. Weis

It is certified that error appears in the above—identified patent and that said Letters Patent is hereby corrected as shown below:

Column 2, line 10:

Following "872,265," insert --now U.S. Pat. No. 4,258,841,--

Column 4, line 20:

"is" should be --in--

Column 7, line 17:

"perpendicularly" should be --perpendicular--

Column 7, line 21:

"an" should be --and--

Column 7, line 30:

"are" should be --and--

Column 8, line 21:

"arund" should be --around--

UNITED STATES PATENT AND TRADEMARK OFFICE
CERTIFICATE OF CORRECTION

PATENT NO. : 4,297,959

DATED : November 3, 1981

INVENTOR(S) : Charles C. Frost, Siegfried K. Weis

It is certified that error appears in the above—identified patent and that said Letters Patent is hereby corrected as shown below:

Column 10, line 4:

"52a-32d" should be --32a-32d--

Column 10, line 37:

"edges" should be --edge--

Column 11, line 28:

after "stainless" insert --steel--

Signed and Sealed this

Fourteenth Day of December 1982

[SEAL]

Attest:

GERALD J. MOSSINGHOFF

Attesting Officer

Commissioner of Patents and Trademarks